July 22, 1952 P. SPURLINO ET AL 2,604,041

SELECTABLE RECORDING MEANS FOR ACCOUNTING MACHINES

Filed July 12, 1950 7 Sheets-Sheet 1

INVENTORS
PASCAL SPURLINO &
MARVIN D. FROST

BY Carl Beust
Ayres D. Stoddard

THEIR ATTORNEYS

July 22, 1952 P. SPURLINO ET AL 2,604,041

SELECTABLE RECORDING MEANS FOR ACCOUNTING MACHINES

Filed July 12, 1950 7 Sheets-Sheet 2

INVENTORS
PASCAL SPURLINO &
MARVIN D. FROST

BY Carl Beust
Ayres D Stoddard
THEIR ATTORNEYS

SELECTABLE RECORDING MEANS FOR ACCOUNTING MACHINES

Filed July 12, 1950 7 Sheets-Sheet 3

INVENTORS
PASCAL SPURLINO &
MARVIN D. FROST

BY Earl Beust
Ayres D. Stoddard
THEIR ATTORNEYS

July 22, 1952 P. SPURLINO ET AL 2,604,041

SELECTABLE RECORDING MEANS FOR ACCOUNTING MACHINES

Filed July 12, 1950 7 Sheets-Sheet 4

INVENTORS
PASCAL SPURLINO &
MARVIN D. FROST

BY Carl Beust
Ayres D. Stoddard

THEIR ATTORNEYS

SELECTABLE RECORDING MEANS FOR ACCOUNTING MACHINES

Filed July 12, 1950 7 Sheets-Sheet 5

INVENTORS
PASCAL SPURLINO &
MARVIN D. FROST
BY Earl Beust
Ayres D. Stoddard
THEIR ATTORNEYS

SELECTABLE RECORDING MEANS FOR ACCOUNTING MACHINES

INVENTORS
PASCAL SPURLINO &
MARVIN D. FROST
BY Earl Beust
Ayres D. Stoddard
THEIR ATTORNEYS

SELECTABLE RECORDING MEANS FOR ACCOUNTING MACHINES

Filed July 12, 1950 7 Sheets-Sheet 7

FIG. 16

| | PLATE 1 | | PLATE 2 | | PLATE 3 | | PLATE 4 | | PLATE 7 | | PLATE 8 | |
|---|---|---|---|---|---|---|---|---|---|---|---|---|
| | CONTROLLED BY KEYS OF ROW 1 | | CONTROLLED BY KEYS OF ROW 2 | | CONTROLLED BY KEYS OF ROW 3 | | CONTROLLED BY KEYS OF ROW 4 | | CONTROLLED BY KNOB 1 | | CONTROLLED BY KNOB 2 | |
| | CUT NOTCHES IN | | CUT NOTCHES IN | | CUT NOTCHES | | CUT NOTCHES IN | | CUT NOTCHES IN | | CUT NOTCHES IN | |
| | A POSITION | B POSITION | A POSITION | B POSITION | A POSITION | B POSITION | A POSITION | B POSITION | A POSITION | B POSITION | A POSITION | B POSITION |
| TAPE HAMMER 1 | | 0-1-3 4-5-6 | 0-1-2 | | 9 | | NO | PLATE | 0-1-2 3-4 | | 0-1-2 | |
| TAPE HAMMER 2 | | 0-1-3 4-5-6 | 0-1-2 | 0-1-2 | 0 | 8 | 1 | 0 | 0 | 1-2-3-4 | 0-1-2 | 0-1-2 |
| TAPE HAMMER 3 | | 0-1-3 4-5-6 | 0-1-2 | 0-1-2 | 0 | 7 | 2 | 0 | 0-1 | 2-3-4 | 0-1-2 | 0-1-2 |
| TAPE HAMMER 4 | | 0-1-3 4-5-6 | 0-1-2 | 0-1-2 | 0 | 6 | 3 | 0 | 0-1-2 | 3 4 | 0-1-2 | 0-1-2 |
| TAPE HAMMER 5 | | 0-1-3 4-5-6 | 0-1-2 | 0-1-2 | 0 | 5 | 4 | 0 | 0-1-2-3 | 4 | 0-1-2 | 0-1-2 |
| TAPE HAMMER 6 | | 0-1-3 4-5-6 | 0-1-2 | | NO | PLATE | 5 | | 0-1-2 3-4 | | 0-1-2 | |
| TAPE HAMMER 7 | | 0-1-3 4-5-6 | 0-1-2 | | NO | PLATE | 6 | | 0-1-2 3-4 | | 0-1-2 | |
| TAPE HAMMER 8 | | 0-1-3 4-5-6 | 0-1-2 | 0-1-2 | NO | PLATE | 7 | 7 | 0-1-2 3-4 | 5 | 0-1-2 | 5 |
| TAPE HAMMER 9 | | 0-1-3 4-5-6 | 0-1-2 | 0-1-2 | NO | PLATE | 8 | 8 | 0-1-2 3-4 | 5 | 0-1-2 | 4-5 |
| TAPE HAMMER 10 | | 0-1-3 4-5-6 | 0-1-2 | 0-1-2 | NO | PLATE | 9 | 9 | 0-1-2 3-4 | 5 | 0-1-2 | 3-4-5 |

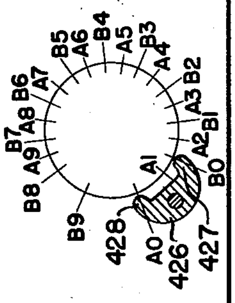

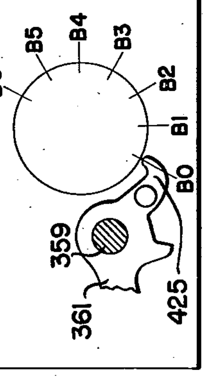

INVENTORS
PASCAL SPURLINO &
MARVIN D. FROST
BY Earl Beust
Ayres Stoddard
THEIR ATTORNEYS Patented July 22, 1952 2,604,041

UNITED STATES PATENT OFFICE 2,604,041

SELECTABLE RECORDING MEANS FOR ACCOUNTING MACHINES

Pascal Spurlino, Oakwood, and Marvin D. Frost, Dayton, Ohio, assignors to The National Cash Register Company, Dayton, Ohio, a corporation of Maryland Application July 12, 1950, Serial No. 173,298

14 Claims. (Cl. 101—96)

This invention relates to accounting machines and similar business machines and is directed to the recording means of such types of machines.

More particularly the invention relates to accounting machines having a plurality of individual record strips or tapes and having means for variably selecting the individual record strips or tapes to receive printed data thereon.

The particular type of accounting machine in which the present invention is embodied is shown in the United States Letters Patent No. 2,361,662, issued October 31, 1944, to Pascal Spurlino and Konrad Rauch.

The paper chute for the record strips of the present invention is, however, of the type shown and described in the United States Patent No. 2,487,901, issued on November 15, 1949, to Pascal Spurlino, Jacob Gantner, and Walter J. Kreider.

Machines of the general type in which the present invention is embodied are shown in the following United States Letters Patent, and reference may be had to them for a complete showing and description of standard mechanisms not fully disclosed herein: United States Patents Nos. 1,619,796; 1,747,397; and 1,761,542, issued March 1, 1927; February 18, 1930; and June 3, 1930, respectively, to Bernis M. Shipley; No. 2,175,346, issued October 10, 1939, to Maximilian M. Goldberg; No. 2,141,332, issued December 27, 1938, to Charles H. Arnold; and No. 1,693,279, issued November 27, 1928, to Walter J. Kreider.

The machine embodying the present invention, and as now constructed, is well adapted for use by banks, and especially in the Proof Department thereof, where the various items are listed and distributed and deposits are checked for a proof balance at the end of each day.

Each bank, in its Proof Department, keeps an accurate record of each transaction handled by the bank, which transactions generally come from incoming mail, out-of-town mail, or transit banks, including clearings from local banks, and receiving and paying items handled by the tellers of the bank, and also from incoming clearings from out-of-town banks.

Many banks require their lists of checks or items paid by another bank to be accompanied by a printed list of checks paid by a bank when these checks are sent back to the bank on which they are drawn.

Therefore, for use in connection with these and other requirements of the bank, a machine which prints individual lists of groups of items provides accurate machine-printed results immediately at the close of the day's business, which printed results are on individual record strips or tapes and may be attached to the various groups of checks being sent back to banks on which those checks are drawn.

Many clearing house banks also desire to keep accurate checks on the number of days of float which are chargeable to various banks in clearing house areas outside of the local clearing house area.

This invention, therefore, provides for the variable selection of the record strips or tapes, which are to receive printed data, in order that tapes may be selected and records kept on various banks, so that the proper charges may be made against those banks for the number of days' float with which they are chargeable.

It is, therefore, one object of this invention to provide an accounting machine with a plurality of individual listing tapes or record strips for recording the items of various classifications thereon, and to provide selecting means for selecting the tapes to be printed upon for particular types of operations or transactions.

Another object is to provide means for selecting tapes to receive the printed records and also to provide other means to supersede the control of the original selecting means whereby other tapes may be selected, depending upon the usage of the machine at that time.

A further object of the present invention is to provide an accounting machine with a plurality of individual record strips or listing tapes and a plurality of manipulative devices for selectively rendering said tapes effective to receive printed data, and also with means to render the selectivity of certain of those manipulative devices ineffective and render other manipulative devices effective.

With these and incidental objects in view, the invention includes certain novel features of construction and combinations of parts, a preferred form or embodiment of which is hereinafter described with reference to the drawings which accompany and form a part of this specification.

In said drawings:

Fig. 16 is a chart of the control or selecting plate groups showing how these groups of plates are notched out for control purposes for the selection of the various record strips or tapes as determined by the keys of rows 2 and 3, shown in Fig. 1.

GENERAL DESCRIPTION

Figure 1:
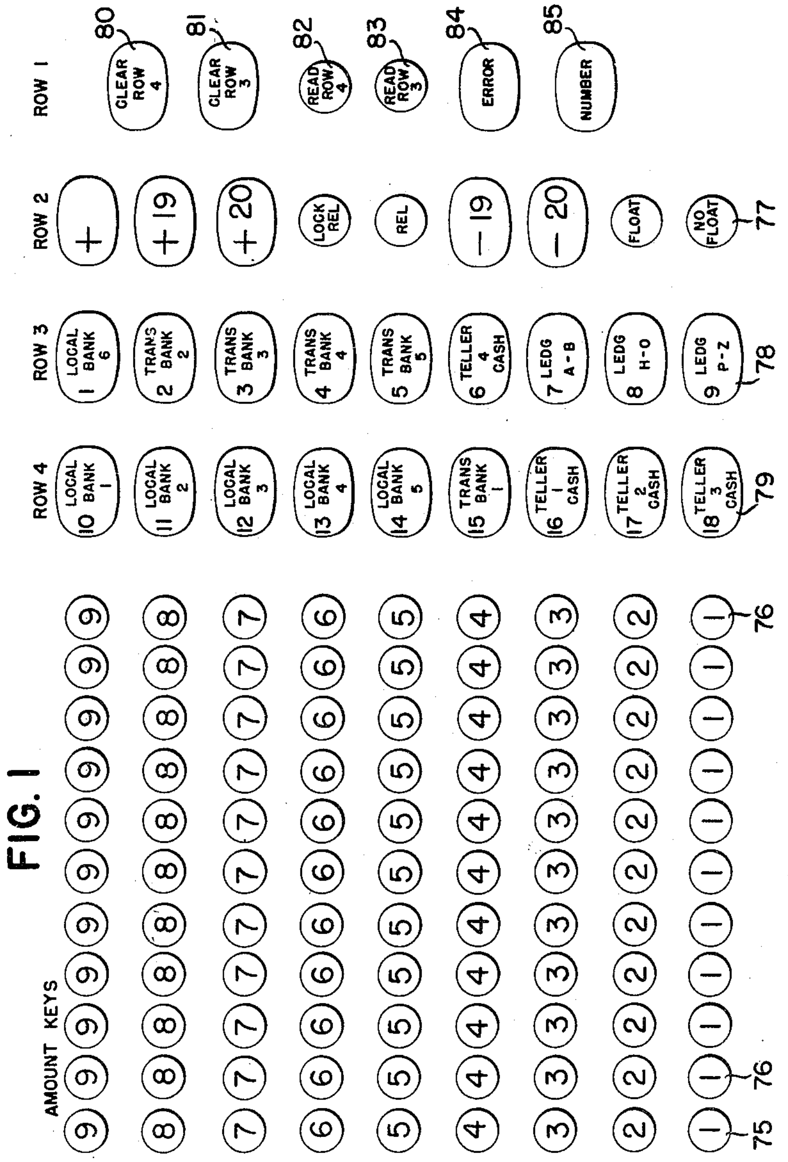
Fig. 1 is a diagrammatic view of the keyboard of the machine.

Described in general terms, the machine embodying the instant invention is of the type generally disclosed in the above-mentioned Shipley, Goldberg, and Spurlino patents. These patents disclose a plurality of totalizers into which may be distributed various amounts, according to the business systems for which the machine is built. In the present instance, the totalizers are adapted to receive the many and various items constituting individual transactions that are handled in the ordinary banking business. Those patents disclose what are known in the art as "add and subtract totalizers" or "crossfooters," from which balances may be printed at any time desired.

There is provided in the machine of the present invention an internal gear driving mechanism such as that disclosed in the above-mentioned Kreider patent, which is for the purpose of simultaneously setting up, on groups of printing devices, amounts and data under the control of keys, so that printing may be accomplished on a particular one of the record strips or individual tapes which may be selected, under control of transaction keys to receive the printing of such data.

As has been previously stated, certain out-of-town banks and also certain local banks require, with checks paid out by the banks having one of the machines of this invention in its Proof Department, a printed list for each of said banks, showing the amount of each of the checks which have been paid by the bank, which checks are drawn on other local banks or out-of-town banks.

Therefore, to provide for such individual item lists, the present invention is provided with ten individual tapes or detail strips with removable frames for carrying those strips, so that the frames can be readily taken out of the machine to have the paper replaced whenever necessary.

The machine keyboard is arranged for taking care of all business in connection with the bank, whereby all transactions handled by the bank may be listed in this machine and printed records made of those transactions. The machine is, therefore, provided with the usual banks of amount keys of sufficient capacity to take care of the ordinary business of any bank.

There are three rows of what are known as control keys, for the purpose of selecting various totalizers for the distribution of the transactions entered in the machine. There is also a row of total-taking control keys, which control the machine for the purpose of taking totals from the various totalizers at the close of the day, when it is desired to clear out the machine to render it ready for business the following morning.

For illustrative purposes, the keys of row 4 are designated for the purpose of entering debits from various local banks and transit banks, and also for keeping records of the cash received by three tellers. The first key in row 3 is used for the purpose of entering debits from a local bank, the next four keys for transit banks, the next key for teller's cash, and the three lower keys for ledger accounts. Associated with keys Nos. 1 and 10 to 18 are ten individual record strips or tapes upon which are printed the amounts charged to the various banks and tellers.

Associated with each one of these keys 1 to 10 is one of the removable individual listing tapes above referred to. There is mechanism in the machine under control of these ten keys which selects the proper one of the individual tapes to receive the printed impression of the amount of the item being entered in the machine.

Prior to the entry of these debits, the total amount of the entire block or debit is first entered in the crossfooter by the depression of the plus key in row 2, at the top of this row, when the transaction relates to a customer's deposit. This of course takes place after the amount of the total has been set up on the keyboard. This total amount goes into the plus side of the crossfooter, and, as each of the various debits is entered in the machine, these debits may be distributed to any one or all of the ten totalizers associated with the first ten keys mentioned—that is, the nine keys in row 4 and the top key in row 3—and these individual amounts are subtracted from the crossfooter, so that, at the end of the entry of the several items of this particular batch, the crossfooter should be clear, which of course is proof that the items were properly totaled.

These items may come from the teller's cage and usually are the deposits made by the customers having checking accounts in the bank.

At the same time that the deposit of a customer is run through this bank proof machine, a deposit slip may be printed upon the back thereof, upon which deposit slip are listed all of the items of that deposit.

Also, when a person comes into the bank to cash a check, the check may be placed in the machine and a verifying amount printed on the back of the check by the machine.

When it is desired to cause the keys 2, 3, 4, or 5 of row 3 to select one of the individual record strips, the machine is provided with manually adjustable mechanism for varying or changing the control of the keys of row 4 and the top key of row 3, so that all five top keys of row 3 and all five top keys of row 4 may control the selection of the various individual tapes instead of all of the keys of row 4 and only one key in row 3.

This is particularly useful when a clearing house bank is desirous of keeping a closer check on individual transit banks with regard to their float, so that the proper charges may be made in the clearing house for that float.

Of course, when the first five keys of row 3 and the first five keys of row 4 are arranged to control the selection of the various individual tapes, then the four bottom keys of row 4 are no longer effective to select any of the individual tapes.

DETAILED DESCRIPTION

*Framework and operating mechanism*

Figure 5:
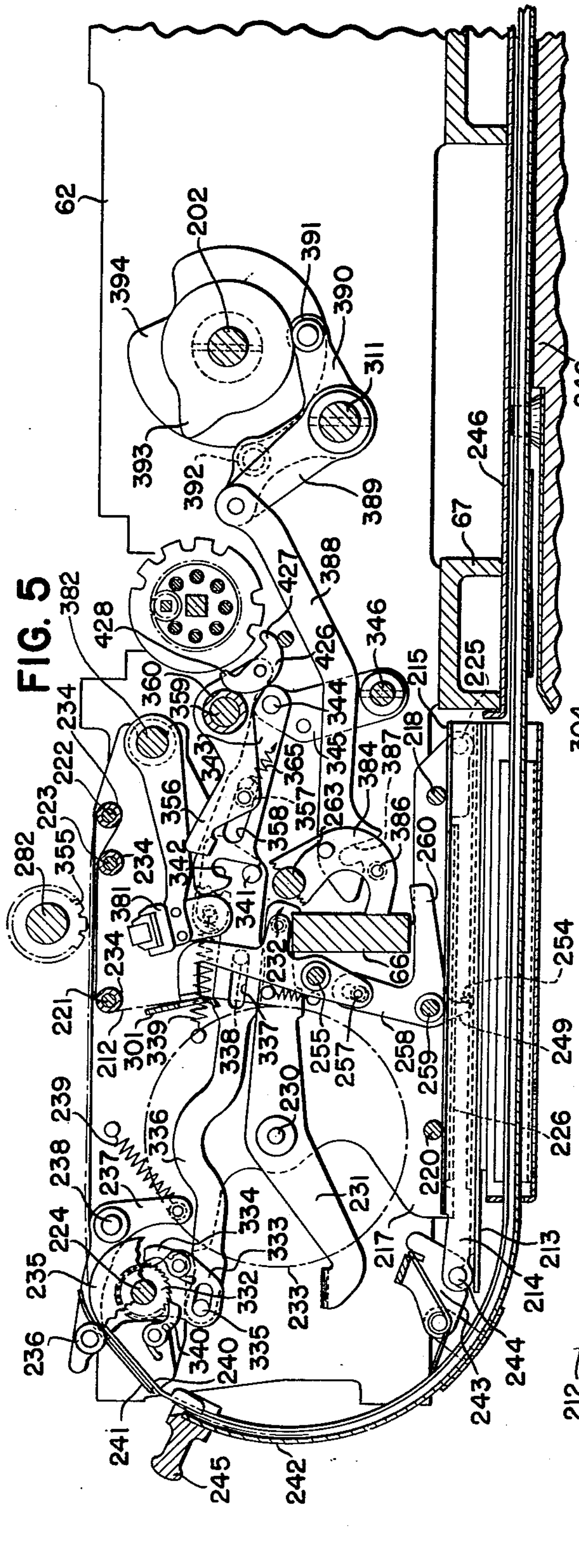
Fig. 5 is a section taken through one of the individual record strip or tape mechanisms and shows the tape feeding mechanism, the tape printing mechanism, and the paper chute for guiding the paper downward and backward so that it will be projected out at the rear of the machine.

The machine framework for the main part of the machine comprises a left frame 60 (Figs. 2 and 3) and a right side frame (not shown), which support most of the machine mechanisms, which are in turn secured to a base 61 and are further supported in relation to each other by various cross frames, rods, and bars. The base 61 rests on and is secured to four printer frames 62, only two of which are shown in Figs. 2, 3, 5, and 12. These printer frames are held in proper relationship to each other by tie rods 66 (Fig. 5), only one of which is shown in this present case. All four printer frames rest on the surface of a sub-base 67 (Fig. 5).

The machine proper and also the printing mechanism thereof are enclosed in a suitable cabinet 70 (Fig. 2), having the necessary hinged openings for access to certain parts of the machine by the operator whenever necessary. All hinged openings are provided with suitable locks to prevent unauthorized persons from having access to the inner part of the machine.

*Machine operating mechanism*

Normally the machine is electrically operated by a conventional type of motor, such as that disclosed in the Shipley patents referred to hereinbefore, and, in addition, a hand crank is provided for operating the machine manually, when necessary. The well-known motor starting bar used on previous machines has been omitted from this machine, and, instead, the machine is released for operation by any one of a plurality of so-called "motorized" or "operating" keys located in row 1 or the total control row and also in rows 2, 3, and 4. These keys and their use will be explained more in detail in this specification.

Depression of any of the "operating" keys releases a key lock shaft 71 (Figs. 2, 3, and 8) to the action of a spring (not shown), which rocks said shaft clockwise to operate the clutch mechanism which connects the driving motor to a main drive shaft 72 journaled in the left side frame 60 and the right side frame (not shown). The movement of this key lock shaft 71 simultaneously operates the switch mechanism which closes the circuit to the motor, thus causing the motor to operate and, through gearings shown in the above-mentioned Shipley patents, drive the main drive shaft 72.

After the machine has performed the proper number of cycles to complete the type of operation being executed, the key lock shaft is returned counter-clockwise to disengage the clutch mechanism and simultaneously open the switch to the electric motor. When the machine is manually operated by the use of the hand crank, the operating keys are used for releasing the machine in exactly the same manner as when the machine is electrically operated.

*Keyboard*

The keyboard of the machine is shown in diagrammatic form in Fig. 1. At the extreme left there is a row of keys 75, which may be used to control the printing of any desirable special designations in connection with any item entered in the machine. There are ten rows of amount keys 76, which may have thereon, when desired, two numbers complementary to each other, as shown in the above-mentioned Spurlino et al. Patent No. 2,361,662. The small numbers are the complementary numbers and are used in setting up complements to correct errors when the operator makes a mistake in setting up the amount or when a depositor has added incorrectly on his deposit slip. There are three banks or rows of transaction keys 77, 78, and 79, designated row 2, row 3, and row 4, respectively.

When a customer's deposit is to be entered and distributed by the machine, the total of the deposit is set up on the amount keys 76, and the plus key 77 in row 2 is depressed and the machine put through one operation, wherein the total of the deposit is entered in the cross-footer and also in a group totalizer, which is located in the tenth position in row 4.

A distribution of the various items making up the total of the deposit just entered is then made, the operator setting up the amount of each check and distributing these amounts in any of the proper totalizers related to the eighteen transaction keys in rows 3 and 4. The transaction keys in row 4 and the top transaction key in row 3 also control the selection of special individual listing tapes, which will be hereinafter described, whereupon the amount of the checks as they are distributed is printed upon these individual tapes.

Also, as before stated, the control of the selection of these tapes may be changed by means to be hereinafter described, whereby the top five keys 78 of row 3 and the top five keys 79 of row 4 may control the selection of these individual recording tapes or detail strips, and, when the machine is set for such selection, the four lower keys 79 of row 4 are no longer controlling keys for tape selection.

The row of keys at the extreme right is known as the "Total Control Row," or "row 1," and this row has six keys 80 to 85 inclusive. The first four keys 80 to 83 inclusive are used to control the machine for taking totals and sub-totals from the totalizers associated with keys in rows 3 and 4. The key 84 sub-totals the cross-footer to print the amount of an error to show whether or not this error is a plus error or a minus error. The key 85 is in the add position and is used with keys minus 19 and minus 20 of row 2, and all of the keys in rows 3 and 4.

Figure 2:
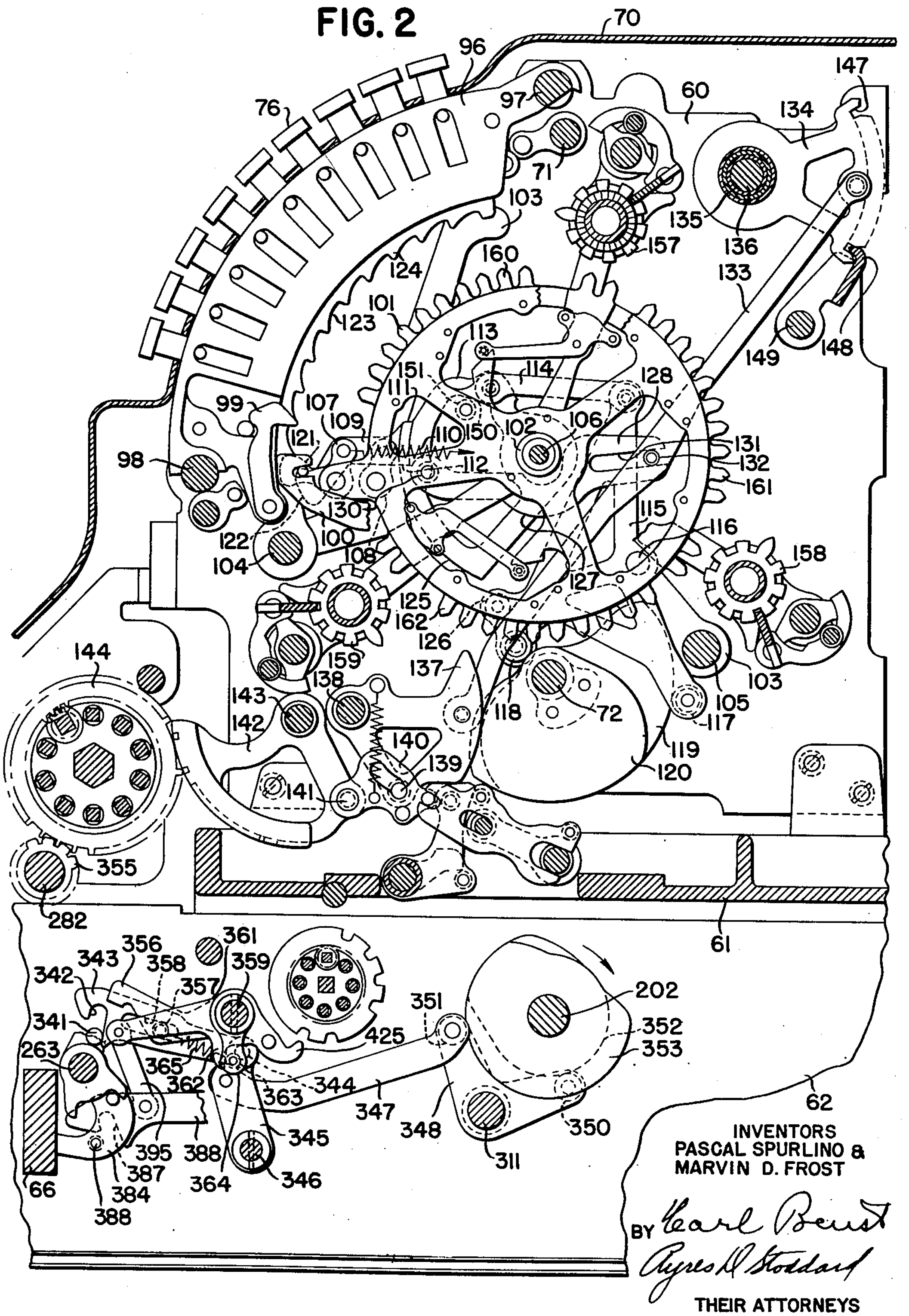
Fig. 2 is a sectional view of the machine taken from the right of one of the amount banks and shows said bank and the differential mechanism associated therewith, and also shows a portion of the tape selection and tape feed operating means.

The present machine has a total control plate (not shown) for controlling the engaging and disengaging movements of the three totalizer lines shown in Fig. 2 in adding, non-adding, subtracting, total printing, and sub-total printing operations. The positioning of this total control plate is controlled by the total keys 80 to 85 inclusive. Such a plate is shown in the above-mentioned Goldberg patent and also in the above-mentioned Spurlino and Rauch Patent No. 2,361,662.

The present machine has three lines of totalizers, including two lines of adding totalizers and, on the third line, an add-subtract or balance totalizer, known in the art as a "crossfooter." The adding totalizers on the various lines and the crossfooter are selected for engagement with the actuators by means of keys in rows 2, 3, and 4 (Fig. 1).

The manner in which the transaction keys 77, 78, and 79 control the selection of the different totalizers and the manner in which the keys 80 to 85 and the total control plate (not shown) control the engaging and disengaging movement of the different totalizer lines are fully explained in the Shipley patents previously referred to, and also in the Shipley Patent No. 2,262,258, issued on November 11, 1941. Therefore, only a brief general description of such mechanism will be given herein.

*Amount banks and their associated differential mechanisms*

As previously stated, the machine of this invention has ten rows of amount keys, and as all of the rows or banks of keys and their associated differential mechanisms are similar in every respect, it is believed that a description of one of these rows of keys and its differential mechanism will be sufficient.

Fig. 2 is a transverse sectional view of the machine taken just to the right of one of the amount banks, showing said bank and its associated differential mechanism, which will be considered as representative of all of the amount banks.

The amount keys 76 (Fig. 2) are mounted in a key frame 96 supported by rods 97 and 98 extending between the main frames of the machine. Depression of one of the keys 76 rocks a zero stop pawl 99 for this particular denomination counter-clockwise out of the path of a reset spider 100 free on a hub of an amount differential actuator 101 rotatably supported by a hub 102 extending between two similar amount differential support plates 103 (only one of which is shown here) in turn supported by rods 104 and 105 extending between the main machine frames. There is a pair of the support plates 103 for each of the amount differentials, and a tie rod 106 extends through the holes in the center of the hubs 102 to secure all of the amount differentials in a compact unit.

A slot in the forward end of the spider 100 engages a stud in a latch-disengaging arm 107 pivoted on an extension of the actuator 101. The arm 107 and a companion arm 108 together support a differential latch 109 for radial shifting movement. A spring 110 urges the arms 107 and 108 and the latch 109 rearwardly to normally hold a foot 111 of said latch in engagement with a shoulder 112 on a differential driver 113 rotatably supported on the hub of the actuator 101. A link 114 pivotally connects the driver 113 to a lever 115 pivoted on a stud 116 in the left-hand one of the plates 103, and said lever 115 carries rollers 117 and 118, which cooperate, respectively, with the peripheries of companion plate cams 119 and 120, secured on the main drive shaft 72. Depression of one of the amount keys 76 likewise moves the lower end thereof into the path of a rounded surface 121 of an extension of the arm 107.

In adding operations, the main shaft 72 and the cams 119 and 120 make one clockwise revolution, causing the lever 115 to rock the driver 113 first clockwise and then counter-clockwise back to normal position. During its clockwise movement, the driver 113, by means of the shoulder 112 in cooperation with the foot 111 of the latch 109, carries said latch and the amount actuator 101 clockwise in unison therewith until the rounded surface 121 contacts the stem of the depressed key 76. This rocks the latch arm 107 and its companion arm 108 counter-clockwise to disengage the foot 111 from the shoulder 112 to interrupt the clockwise movement of the actuator 101 and to position said actuator in proportion to or commensurate with the depressed amount keys 76. Disengaging movement of the latch 109 moves a rounded extension 122 thereof into engagement with the corresponding one of a series of locating notches 123 on a plate 124 secured between the tie rod 104 and the upper extension of the left-hand support plate 103.

After the latch 109 is disengaged from the shoulder 112 of the driver 113, said driver continues its clockwise movement without interruption, causing an arcuate surface 125 thereof, in combination with the sole of the foot 111, to lock the extension 122 of the latch 109 in a notch 123 corresponding to the depressed amount key. When the lever 115 and the driver 113 reach the termini of their initial movements clockwise, a roller 126, carried by said lever 115, engages an arcuate surface 127 on the under side of an amount beam 128, pivoted at 130 to the actuator 101, and forces an arcuate surface on the upper edge of said beam into contact with the hub of said actuator 101 to position the beam 128 in proportion to the depressed amount key 76. The beam 128 has a slot 131, which engages a stud 132 in a link 133, the upper end of which is pivotally connected to an aligning segment 134 mounted on one of the series of nested tubes 135 supported by a shaft 136 journaled in the side frames of the machine. The lower end of the link 133 is pivotally connected to a segment 137 free on a shaft 138 journaled in the machine side frames.

The segment 137 carries a stud 139, which engages a camming slot in a zero elimination cam plate 140 pivotally mounted on a stud 141 in a segmental gear 142 free on a shaft 143, journaled in the side frames of the machine. The teeth of the segmental gear 142 mesh with the external teeth of an external-internal ring gear 144, the internal teeth of which mesh with a pinion which drives a square shaft. The square shaft in turn drives similar pinions meshing with the internal teeth of gears similar to the gear 144, the external teeth of which gears are adapted to mesh with and drive corresponding denominational type wheels in each row of the column-printing mechanism, which column-printing mechanism in the present case is for the purpose of printing on the individual listing tapes to be hereinafter described, and also for printing on a master tape, which is not shown in this particular case, but which is shown in the above-mentioned Spurlino and Rauch Patent No. 2,361,662.

This above method of driving the type wheels of the column-printing accounting machines is fully explained in the previously-mentioned Arnold Patent No. 2,141,332 and embodies an application of the driving mechanism disclosed in the above-mentioned Kreider Patent No. 1,693,279.

For the purpose of aligning the differential mechanism and the type wheels set thereby, there is provided on each of the segments 134 a series of notches 147 engaged by an aliner 148 secured to a shaft 149.

The aliner 148 is disengaged from the notches 147 during the differential setting of the type wheels, and, after they have been set under the control of the keys through the differential mechanism, the aliner 148 is again moved into engagement with the notches 147, thus positively alining the type wheels.

Return movement, counter-clockwise, of the driver 113 causes a surface 150 thereon to engage a stud 151 on the actuator 101 and return said actuator to normal position. During such movement of the actuator, the foot 111 of the latch returns to its normal position above the shoulder 112 of the driver 113.

The zero elimination mechanism above mentioned, which is for the purpose of controlling the printing of zeros and which is controlled by the above-mentioned zero elimination cam plate 140, is not directly involved in the invention in the present application, and, therefore, no further reference to the zero elimination mechanism will be given herein, such type of zero elimination mechanism being illustrated and described in the above-mentioned Arnold Patent No. 2,141,332.

*Totalizers*

The machine of this invention has two lines of the usual well-known interspersed adding totalizers, one line being located on a rear or #2 totalizer line and the other line being located on a front or #3 totalizer line, and in addition has one add-subtract totalizer or cross-footer on the #1 totalizer line, which is known as the upper line.

The add-subtract totalizer or crossfooter on the #1 line is indicated by the reference number 157. The totalizer wheels of the totalizers on the #2 or back line are designated 158, and the interspersed totalizers on the front or #3 line are designated 159.

The totalizers of these three types are old and well known in the art and are fully illustrated and described in the previously-mentioned Shipley patents, and, therefore, no further description of the construction of these totalizers is thought necessary herein.

As is usual in machines of this type, the actuators 101 are divided into three tooth sections, shown at 160, 161, and 162 in Fig. 2. The sections 160 actuate the add and subtract totalizer or crossfooter on line #1. The tooth sections 161 actuate the totalizers 158 on line #2 and the tooth sections 162 actuate the totalizers 159 on the front or #3 line.

In adding operations, the wheels of the selected totalizer or totalizers, as the case may be, are engaged with their respective sets of actuating tooth sections 160, 161, and 162 of the actuators 101 after said actuators complete their setting movement in a clockwise direction under the control of the amount keys. Return movements counter-clockwise of the actuators 101 rotate the corresponding wheels of the selected and engaged totalizer or totalizers in proportion to the value of the depressed amount keys 76 to enter in said totalizers the amount corresponding to the keys depressed.

In subtract operations, the corresponding subtract wheels of the balance totalizer or cross-footer 157 are engaged with the teeth 160 of the actuator 101 exactly the same as in adding operations, and the return movement of the actuator reversely rotates the adding wheels 157 of the crossfooter through the reverse gearing shown in Fig. 2, which is well known in the art and shown in several of the above-mentioned Shipley patents.

If no amount keys 76 of a bank (Fig. 2) are depressed, the zero stop pawl 99 of that bank remains in the path of the spider 100 and, upon initial movement of the spider by the actuator 101, engages said spider and disengages the latch 109 from the driver 113 to locate said actuator in zero position. After the actuator 101 is positioned at zero, the roller 126 positions the beam 128, the link 133, and the segments 134 and 137 in proportion thereto, as shown in Fig. 2. At the end of any type of operation, the actuator 101 is always returned to home position, as above described. However, the links 133, the aliner segments 134, and the printing mechanisms controlled thereby remain in set positions at the end of machine operations and are moved directly from these set positions to their new positions in the succeeding operations of the machine through the beam 128 and associated mechanism, which is old and well known in the art and is often referred to as the "minimum movement device."

The usual tens transfer mechanism is provided for transferring positive and negative tens transfers from lower to higher denominational orders.

*Transaction keys*

The transaction keys 77 of row 2 have various features. The "no-float" and "float" keys both control the addition in the minus side of the crossfooter and, of course, control printing of the amounts as set up on the keyboard when these keys are depressed.

The keys, minus 19 and minus 20, both control addition in the minus side of the cross-footer, and key minus 19 controls addition into one group total and key minus 20 controls addition into another group total. The release key 5 is used to release the "float" and "no-float" keys. The lock release key is used to release the machine for an operation when an error has been made. The plus key 77 and the plus 19 and plus 20 keys all cause addition to be made in the plus side of the crossfooter, and, in addition, the plus key 19 causes addition to be made in the group total, the same as minus key 19, and the plus key 20 causes addition to be made in the group total, the same as minus key 20.

In other words, when the keys plus 19 and plus 20 and minus 19 and minus 20 are operated, they are used in conjunction with other keys to cause the distribution of amounts set up on the amount keyboard in the same way as the bank customers' deposits are set up and distributed.

In connection with the keys 19 and 20, they are used for entering many types of transactions or credits which are run through the machine in the Proof Department. For example, a credit letter may come in from an out-of-town bank, and this may be run through and set up in conjunction with key 19 or 20 and then distributed in succeeding operations and classified as necessary. But particularly key 20 is used for checking account deposits of bank customers, and the key 19 is used for all other types of credits which are to be distributed and charged against various accounts by the keys of rows 3 and 4.

In connection with the lock release key 77, the following example may be of assistance. In running a deposit through the machine, the operator first sets up the total deposit, which we will say is $100.00, and this deposit is made up of three checks—one for $50.00 and two for $25.00 each. For the first operation, the operator sets up $100.00 and depresses the plus 20 key in row 2, which key selects the positive wheels of the add-subtract totalizer or crossfooter on the #1 totalizer line to cause this amount to be entered additively thereon and at the same time selects a group total on line 3. This is one operation. This deposit of $100.00 is now distributed. We will say, for example, that two of the checks came from local bank #1 and one check from local bank #2. The next step for the operator is to set up the amount of $50.00 for the $50.00 check and depress the local bank #1 key in row 4, which releases the machine for operation. This causes the amount of $50.00 to be subtracted from the crossfooter and to be added into the totalizer selected by local bank #1 key 79. Next, the operator sets up $25.00 and depresses local bank #1 key, which causes $25.00 to be subtracted from the crossfooter and added into the selected totalizer. Now, for the third operation, $25.00 should be set up, but we shall say, for the purposes of illustration here, that the operator sets up $26.00 and depresses the local bank #2 key. This subtracts $26.00 from the cross footer, leaving the crossfooter not at zero but in a state where $1.00 is on the minus side thereof. The operator does not know that a mistake has been made and therefore proceeds to set up the total amount of the deposit for the next person. When the total deposit has been set up on the amount keyboard, the operator then depresses the plus 20 key 77, but it will not release the machine, because the crossfooter or add-subtract totalizer is not at zero, since there was an error made during the distribution of the last deposit. Therefore, the operator now depresses the Error key 84 to determine how much of an error there is in the crossfooter, and whether or not it is on the positive or negative side of the crossfooter, and immediately finds that there is $1.00 on the negative side of the crossfooter.

Therefore, $1.00 is now set up on the keyboard, and the lock release key 77 in row 2 is depressed in combination the plus 20 key of row 2, whereupon $1.00 is added on the crossfooter, leaving the crossfooter in zero position. This amount of the error is printed on a tape in the machine for recording purposes.

The keys of row 2 select related totalizers on the #2 line of the interspersed totalizers, as shown in Fig. 2.

Figure 3:
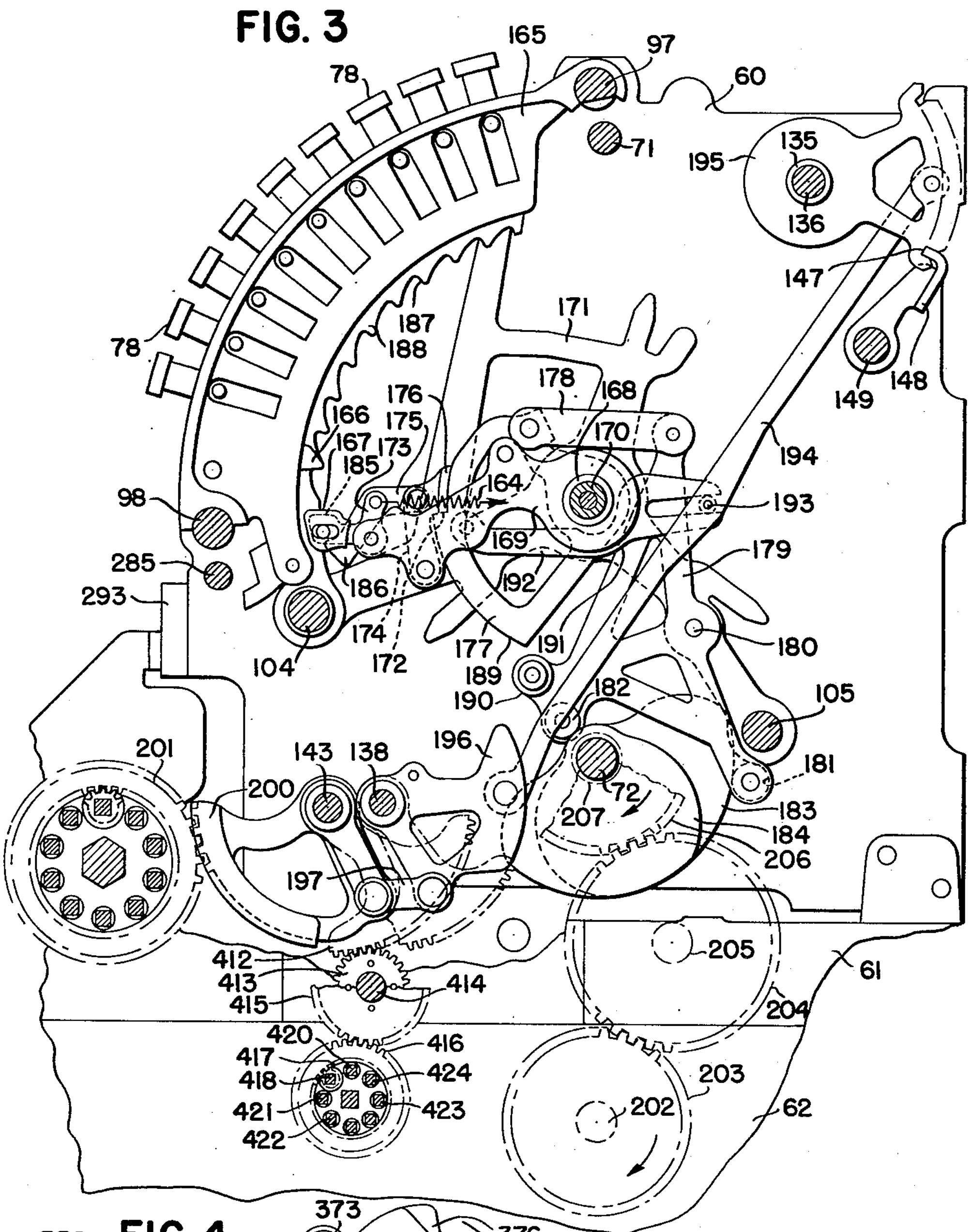
Fig. 3 is a sectional view of the machine taken to the right of the second transaction bank or row 3, as it is designated in Fig. 1, and shows said bank and the differential mechanism associated therewith.
Figure 4:
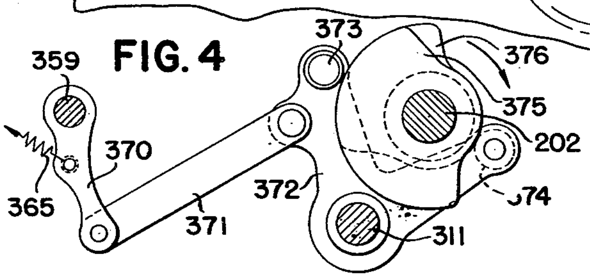
Fig. 4 is a detail of the cam device for releasing the tape feed selecting means and the tape hammer selecting means for selective operation and for restoring said means to normal position after selection.

The keys 78 of row 3 control the differential mechanism, as illustrated in Fig. 3. The #1 key of row 3 controls one of the individual listing tapes, and the keys 2, 3, 4, and 5 of row 3 may also be controlled to select individual listing tapes in a manner to be hereinafter described.

The keys 79 of row 4 all control the selection of individual listing tapes at certain times and at other times may be controlled so that only keys 10 to 14 control the selection of individual listing tapes, and keys 15 to 18 are rendered ineffective. This control of the key selection of the individual listing tapes will be described hereinafter.

All of the keys of rows 2, 3, and 4 are motorized or operating keys and cause the machine to be released on the depression thereof when distributions are made. The differential mechanisms associated with these rows of keys are substantially the same, and, therefore, a description of the row of keys 78 and the differential mechanism associated therewith will be given. As this differential mechanism is differentially controlled in a manner similar to the amount differential mechanism described above, and as it is fully illustrated and described in the patents referred to hereinbefore, only a brief description thereof will be necessary herein. As stated above, the keys 78 control a transaction differential mechanism which selects the totalizers corresponding to the keys and which positions the printing wheels for printing symbols corresponding to the keys. This particular differential mechanism also controls mechanism for selecting certain of the individual listing tapes to be printed upon, which tapes will be hereinafter described in detail.

As above mentioned, since the differential mechanisms of rows 2, 3, and 4 are substantially identical, a description of keys 78 of row 3 and its associated differential will suffice for all.

The keys 78 are supported on a key frame 165 carried by the previously-described rods 97 and 98. Depression of one of the keys 78 rocks a zero stop pawl 166 (Fig. 3) for this transaction bank out of the path of the forward end of a spider 167 pivoted on a hub 168 of a differential arm 169 turnably supported by a stud 170 extending between identical support plates 171 (only one shown here) mounted on the rods 104 and 105. The spider 167 has in its forward end a slot which engages a stud in a bell crank 173 pivoted on the arm 169. This bell crank 173 is connected by a link 175 to a latch arm 173, which is pivoted on the differential arm 169. The upper end of the arm 174 has a foot 176, which cooperates with a shoulder 172 on a driver 177, which receives a regular excursion clockwise and then counterclockwise to its normal position each operation of the machine. A spring 174 holds the foot 176 of the latch arm 174 in engagement with the driver 177. The driver 177 is pivoted on the stud 179 and is connected by a link 178 to a lever 179 pivoted on a stud 180 supported by the plate 171. The lever 179 carries rollers 181 and 182, which cooperate, respectively, with the peripheries of companion plate cams 183 and 184 secured to the main drive shaft 72.

Depression of any one of the keys 78 moves its lower end into the path of a forward extension 185 of the bell crank 173, whereupon operation of the machine causes the cams 183 and 184, as previously described, to make one clockwise revolution in an adding and subtracting operation, to rock the lever 179 and the driver 177 clockwise, whereupon the latch foot 176 carries the differential arm 169 and the spider 167 clockwise in unison therewith until the extension 175 of the bell crank 173 engages the end of the depressed key 78. When this occurs, the bell crank 173 is rocked counter-clockwise, whereupon the link 175 rocks the latch arm 174 counter-clockwise and disengages the foot 176 from the shoulder 172 of the driver 177 and causes a rounded nose 186 on an extension of the link 175 to engage with the proper one of a series of aligning notches 187. These notches 187 correspond to the differential positions of the transacttion bank differential and are cut in a plate 188 supported by extensions of the plate 171 and the rod 104. This positions the differential mechanism in proportion to the depressed transaction key 78 without interfering with the oscillating movement of the driver 177 and connected parts. After the latch arm 174 is disengaged from the shoulder 172 of the driver 177, an arcuate surface 189 on the periphery of the driver 177, in cooperation with the sole of the foot 176, locks the latch in the corresponding notch 187 to retain the differential mechanism in set position.

When the lever 179 reaches or nears the terminus of its initial movement clockwise, a roller 190, carried thereby, engages the under surface 191 of a beam 192, pivotally mounted on the differential arm 169, and forces an arcuate upper surface of the beam into contact with an undercut portion of the hub 186 to position said beam 192 in proportion to the depressed transaction key 78. The rear end of the beam 192 embraces a stud 193 of a link 194 pivotally connected at its upper end to an alining segment 195 secured to one of the nested sleeves 135 on the shaft 136. This aliner segment 195 has alining notches 147 to cooperate with the previously-described liner 148, which is mounted on the shaft 149. This liner 148, which alines the amount differential associated means, also alines the transaction differential associated means.

The link 194 is also pivotally connected to a printer positioning segment 196 secured to the shaft 138. The link 194 transmits the differential positioning of the beam 192 to the alining segment 195 and also to the segment 196, the segment 195 being adapted to control mechanism, which shifts the set of wheels of the totalizers on the #2 line to select the appropriate totalizer according to the key 78 depressed, into alinement with the corresponding actuators 101, in the manner which is fully illustrated and described in the above-mentioned Shipley patents.

The segment 196 (Fig. 3) is connected by a link 197 to a segment 200, the teeth of which mesh with the external teeth of an external-internal drive gear 201, similar to the gear 144. The gear 201 is operatively connected to the type wheels and the indicators for the second transmission bank by means of internal teeth therein, in cooperation with drive pinions mounted on a square shaft, and other internal-external gears, according to the principle shown and described in the above-mentioned Kreider patent.

The mechanism described immediately above transmits the differential positioning of the beam 192 to the type wheels and indicators for the second transaction bank, whereupon operation of the printing mechanism causes a symbol characteristic of the depressed transaction key 78 to be printed on the selected one of the individual listing tapes. This differential mechanism also, by means to be described later, controls the selection of various ones of the individual recording tapes or strips.

*Printer*

PRINTER DRIVING MEANS

All of the operating cams in the printing mechanisms are driven from a printer drive shaft 202 (Figs. 3, 4, 5, and 6), which receives its movement from the main drive shaft in the following manner:

Secured to the shaft 202 is a gear 203 (Fig. 3) meshing with a gear 204 mounted on a stud 205 in the base 61. The gear 204 meshes with a gear 206 mounted on a stub shaft 207 in axial alinement with the machine drive shaft 72. The ratio of the gears 203, 204, and 206 is such that one revolution of the drive shaft 72 causes one revolution of the printer drive shaft 202. The stub shaft 207 is connected to the main shaft 72 by a clutch mechanism (not shown), which functions in total-printing operations to disconect the stub shaft 207 from the main shaft 72 during the first cycle of said total-printing operations to prevent operation of any of the printer mechanisms during said first cycle.

The clutch connection between the main drive shaft 72 and the stub shaft 207, which drives the printer in the manner above described, is fully illustrated and described in the United States Patent No. 2,351,541, issued to Everett H. Placke on June 13, 1944.

INDIVIDUAL LISTING TAPES

As has been previously stated, this invention includes ten individual listing tapes, which are selected to have data recorded thereon under control of certain of the keys 78 in row 3 and certain of the keys 79 in row 4.

The selection of the ten tapes under control of the keys 78 and 79, as just above mentioned, may be changed or varied under the control of two differentially adjustable members in a manner to be hereinafter described.

These individual listing tapes are mounted on the front part of the machine and are removable from the machine, so that it is a very easy matter to replace the paper roll when it has been exhausted. Also, extra frames which contain a fresh supply of listing tape may be provided for the banks, so that, if they wish, they may have one always ready to replace a frame in which the supply of tape has been exhausted, so that there will be no appreciable amount of time lost in replenishing the supply of tape during busy hours of the day.

Figure 11:
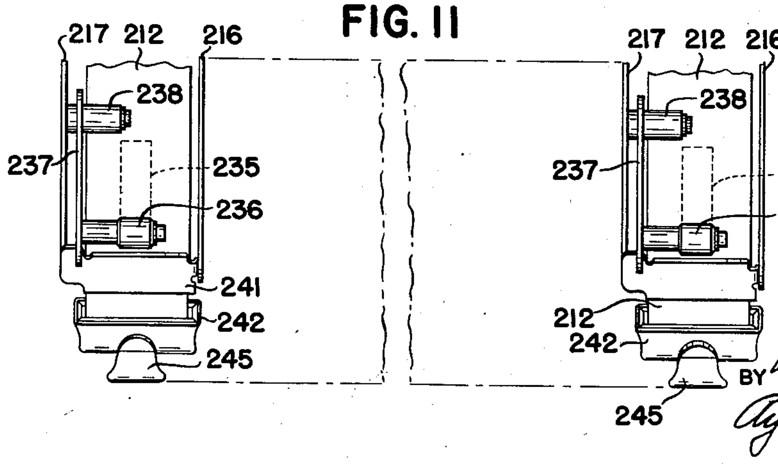
Fig. 11 shows diagrammatically (only two being shown) a plan view of the record strip or record tape frames.
Figures 12, 13, 14:
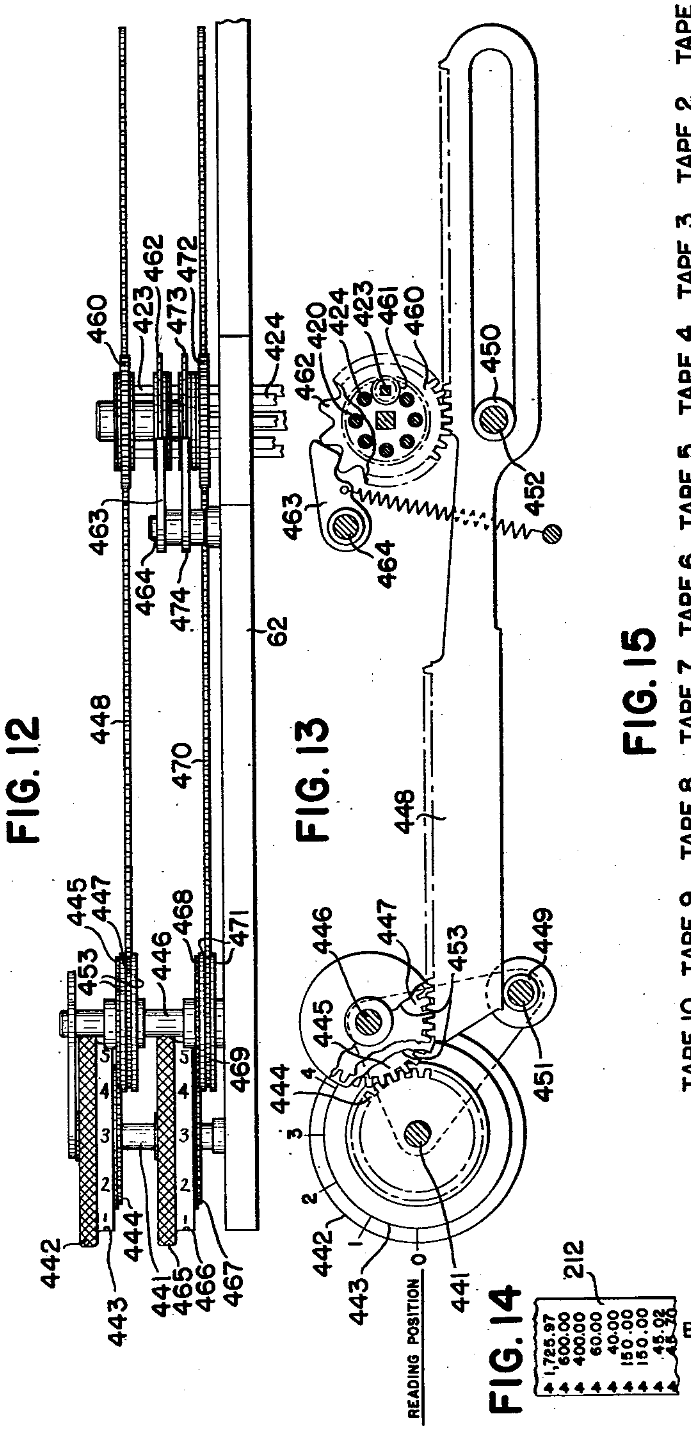
Fig. 12 is a plan view of the mechanism for changing or varying the selection control of the tapes by the keys.
Fig. 13 is a side elevation of the same mechanism.
Fig. 14 is a detail of a portion of one of the record strips or tapes.

A portion of two of these tapes and a part of the frames which support them are diagrammatically shown in Fig. 11, and a section through one of the frames is shown in Fig. 5. Also, a portion of one of the printer tapes by itself, showing printed data thereon, is shown in Fig. 14.

All individual tapes are given the reference number 212, and, since the individual listing tape frames are all alike, and the mechanism for operating the hammers for the tapes and also the feeding mechanism for the tapes are similar for each of the tapes, a description of one frame, the hammer-operating means for its tape, and the feeding means for the tape will suffice for all.

The ten individual listing tape frames are supported on a plate 213 (Figs. 5 and 10) secured to the bottoms of the printer frames 62 of the machine. The plate 213 has secured to its top ten U-shaped guides 214, one for each of the individual listing frames, which guides have lateral flanges 215, the purpose of which will be hereinafter explained.

Referring now to Figs. 5 and 11, each of the tape printing frames is composed of side plates 216 and 217, tied together near their lower edges by rods 218 and 220 and near their upper edges by rods 221, 222, 223, and 224. The rods 218 and 220 rest on top of the flanges 215, and studs 225, one in each of the plates 216 and 217, ride underneath said flanges. The plates 216 and 217 are also provided with flanges 226, which ride underneath the flanges 215.

Therefore, the listing tape frame is kept from any lateral movement and also from any up-and-down movement, the flanges 226 preventing lateral movement and also preventing any movement of the frame too far in an upward direction. Pivoted on a stud 230 (Fig. 5) on the plate 217 is a spring-actuated latch 231, having a nose 232 to latch over the tie bar 66 when the frame is properly located in its operating position in the machine.

To remove the frame from the machine, the operator merely depresses the forward end of the latch 231 to release the nose 232 from the tie bar 66, whereupon the entire frame may be withdrawn from the machine.

The item tape or strip 212 is fed from a supply roll 233 (Fig. 5) over rollers 234 on the rods 221 and 223, around a roller 234 on a rod 222, over a knurled feed roll 235, mounted on the rod 224, and underneath a knurled tension roll 236, carried on a lever 237 pivoted on a stud 238 on the side plate 217 and held in contact with the paper strip by a spring 239. The strip 212 is then fed over a guide plate 240 and underneath a serrated tear-off plate 241, so that the strip may be torn off by the operator when the listing of the checks has been completed.

When the strip 212 is not torn off, it is fed from between the plate 240 and the tear-off plate 241 into the mouth of a combined cover and tape chute 242, which extends downwardly and rearwardly underneath the sub-base 67 to the rear of the machine. This combined cover and tape chute is very similar to the one illustrated and described in the United States Patent No. 2,487,901, issued to Pascal Spurlino, Jacob Gantner, and Walter J. Kreider on November 15, 1949.

The tape chute 242 is held in position by a spring-actuated latch 243 engaging a stud 244 carried by the guides 214.

When it is desired to tear off the strip 212, the operator grasps a handle or knob 245 on the upper front part of the combined cover and guide chute 242 and pulls the same forwardly, which frees the paper between the tear-off plate 241 and the top of the chute, whereby the operator may grasp the paper strip 212, tear it off, and then pull it out of the chute 242. The bottom and rear portions of this chute are supported between guides 246 (Fig. 5).

INTERLOCK BETWEEN LISTING TAPE FRAMES AND MACHINE-RELEASING MECHANISM

It is absolutely necessary that all of the individual listing tape frames be properly latched in their operating positions in the machine before the machine can be released for operation. To make certain that all of the tape frames are so locked and that none of them are out of their normal positions, there is provided an interlocking mechanism, which will now be described.

Figures 8, 9, 10:
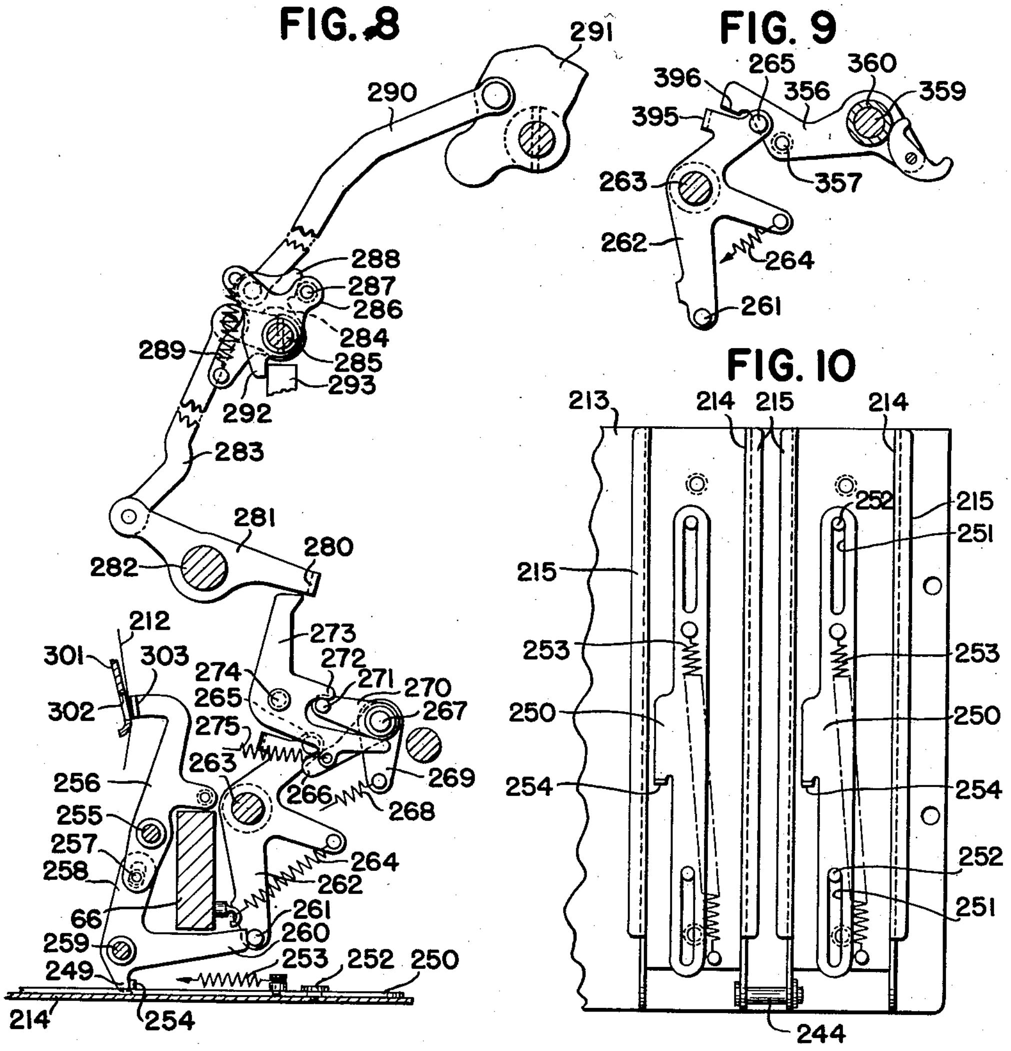
Fig. 8 is a detail view showing the interlocking means to prevent the machine from being released when any one of the record strips or tapes should break and also to prevent release of the machine when any one of the record strip or tape units is removed from the machine.
Fig. 9 is a detail showing a part of the mechanism for the interlocking of the machine to prevent printing after the machine release when the record strip or tape has been broken or become exhausted.
Fig. 10 is a view showing two of the means associated with two of the record strips or tapes which cause the machine release mechanism to be locked to prevent release of the machine when one of the record strips or tapes has been removed from the machine.

Such mechanism is shown particularly in Figs. 8 and 10, and a portion of it in Fig. 5. A slide 250, having slots 251, is slidably mounted on pins 252 in each of the U-shaped guides 214. A spring 253, connected to the slide 250 and to a pin on the guide 214, holds the slide 250 in the position shown in Fig. 10, when the listing tape frame is out of the machine. Each guide 250 is provided with an upturned lip 254.

Pivoted on a rod 255, carried by the listing tape frames 216 and 217, is a lever 256, connected by a pin-and-slot connection 257 to a lever 258, pivoted on a rod 259, also carried by the listing tape frames 216 and 217. The lever 258 has a finger 260, which, when the listing tape frame is put into the machine, contacts the upturned lip 254 of the slide 250 and pushes the slide rearwardly from the position shown in Fig. 10 to the position shown in Fig. 8, whereby the pins 252 are in the forward ends of the slots 251 instead of the rear ends of the slots, as they are in Fig. 10, when the listing tape frame is out of the machine.

The lever 258 has an arm 260, which, when the listing tape frame is slid into the machine and latched in its normal operating position, engages a stud 261 of a lever 262 pivoted on a rod 263 carried by the printer frames 62 and moves said lever 262 into the position shown in Fig. 8 against the tension of a spring 264.

There is a lever 262 for each one of the listing tape frames to cooperate with the arm 260 of its respective frame. The lever 262 carries a pin 265, which normally contacts the upper side of an arm 266 secured to a shaft 267, carried by the printer frames. There is one arm 266 secured to the shaft 267 for each of the levers 262. These arms 266 are all held in contact with their respective pins 265 by means of a spring 268 secured to an arm 269, which is also secured to the shaft 267.

Also secured to the shaft 267 (Fig. 8) is an arm 270, having a pin 271, which normally contacts the under side of a finger 272 of a lever 273, pivoted on a stud 274, supported by one of the printer frames. A spring 275 normally maintains the under side of the finger 272 in contact with the pin 271 of the arm 270.

The upper end of the lever 273 normally lies just to the left of a flange 280 of a lever 281 mounted on a shaft 282 supported by the machine frames. Connected to the lever 281 is a link 283, which is also connected to an arm 284 secured to a shaft 285 supported by the machine frames. Also secured to the shaft 285 is an arm 286 carrying a pin 287. Freely mounted on the shaft 285 is an arm 288, held by a spring 289 in contact with the pin 287. Pivoted to the arm 288 is a link 290, which is also pivoted to a plate 291 secured to the previously-described key lock shaft 71.

The arm 286 has a finger 292 contacting a machine cross bar 293 to hold the parts in their normal positions. The above-described mechanism operates as follows:

When the machine is released in the manner previously described, the key lock shaft 71 is rocked clockwise (Fig. 8), whereupon the link 290 rocks the arm 288 clockwise, which, through the pin 287, rocks the arm 286 and the shaft 285 clockwise, causing the arm 284, through the link 283, to rock the lever 281 clockwise, whereby the flange 280 is moved downwardly and to the right of the upper end of the lever 273.

The above operation, of course, is assuming that all of the individual tape frames are inserted and latched in the machine in their proper normal positions, ready for selection and operation.

Should any one of the individual tape frames not be completely latched in position or be out of the machine, its associated arm 260 would be to the left of the position shown in Fig. 8, away from the pin 261. As soon as this occurs, the spring 264 rocks the lever 262 clockwise, whereupon the pin 265 rocks the associated arm 266 and shaft 267 counter-clockwise, thus rocking the arm 270 likewise and moving the pin 271 downwardly away from the under side of the finger 272 on the lever 273. As the pin 271 is moved downwardly, as just described, the spring 275, which is attached to the lever 273, as previously described, rocks said lever 273 clockwise, thus placing its upper end immediately beneath the flange 280 of the lever 281, and consequently the lever 281 cannot be moved in a clockwise direction, whereupon the link 283, the arm 284, and the train of mechanism from this arm to the plate 291 are held in the normal positions, shown in Fig. 8, thus preventing any clockwise movement of the shaft 71, which in turn prevents the machine from being released whenever any one of the individual tape frames is out of the machine or is not latched in its normal position in the machine to cause its associated arm 260 to hold the pin 261 and the lever 262 in the position shown in Fig. 8.

CONTROL OF MACHINE RELEASE BY THE INDIVIDUAL TAPES

Assuming that all of the individual tape frames are in their proper latched positions in the machine, each of the tapes, by means now to be described, effects a control over the release of the machine, or, in other words, over the clockwise movement of the key lock shaft 71.

As long as the tapes are all properly threaded in each of their individual tape frames and the frames are in their normal positions, the key lock shaft 71 can be rocked clockwise to release the machine. However, should any one of the individual tapes 212 break or should the paper supply roll run out, such breaking or exhaustion of the strip 212 so controls the machine release mechanism that the shaft 71 cannot be rocked clockwise, and, therefore, the machine cannot be released under those conditions.

The tape 212, after it comes from the supply roll, passes over a plate 301 (Figs. 5 and 8) supported by the tape frames 216 and 217. This plate has a hole 302, and, opposite the hole and contacting the tape 212, is a flange 303, which is integral with the previously-described lever 256. This flange 303 is normally held against the tape 212 in the position shown in Figs. 5, 6, and 8.

Should the tape break, the flange 303 enters the hole 302, and the lever 256 is rocked counter-clockwise under the pressure of the spring 253, causing the flange lip, through the finger 249, to rock the lever 258 clockwise. When this occurs, the arm 260 of the lever 258 is moved downwardly away from the pin 261 in the lever 262, and, consequently, the spring 264 rocks the lever 262 clockwise, which rocks the arm 266, the shaft 267, and the arm 270 counter-clockwise, as previously described, thus lowering the pin 271, whereupon the spring 275 rocks the lever 273 clockwise and positions its upper end directly beneath the flange 280 on the lever 281, thus blocking any movement of the key lock shaft 71. Consequently, the machine cannot be released when any one of the individual tapes 212 is ruptured or when the supply roll runs out and there is no paper in front of the hole 302.

During the time the tape 212 is being fed by means to be hereinafter described, it is, of course, very desirable to have the feeler flange 303 away from the tape 212, to prevent any friction.

The means for removing the feeling flange 303 from the tape 212 during the feeding of the tape comprises a pair of cams 304 and 305 (Fig. 6) secured to the printer drive shaft 202, which, it will be recalled, receives one clockwise rotation during each operation of the machine. These cams cooperate with rollers 306 and 307, respectively, on a bell crank 308, connected by a hub 309 to an arm 310, which is pivoted on a shaft 311 carried by the printer frame. A link 312 connects the arm 310 to an arm 318, which is secured to the shaft 263. Also secured to the shaft 263 is a plurality of fingers 319, one adapted to contact a pin 320 on each of the levers 256.

The cams 304 and 305 are so timed that, during the time the individual tapes 212 are being fed, the link 312 is moved to the right, thus rocking the arm 318, the shaft 263, and all of the arms 319 counter-clockwise until the fingers 319 engage the pins 320 and rock all of the levers 256 clockwise to remove the feeling flanges 303 of these levers away from each of the several individual tapes 212 during the time the tapes are fed. After the feeding has taken place, the cams 304 and 305 then restore the fingers 319 to the positions shown, whereupon the levers 256 again assume the positions shown in Figs. 5, 6, and 8.

INDIVIDUAL TAPE FEEDING MECHANISM

As previously stated, the tape 212 is fed between the feed roll 235 and a tension roll 236 (Fig. 5). Pivoted on the rod 224 is an arm 333 carrying a spring-pressed feeding pawl 334 cooperating with the ratchet 332. Connected to the arm 333 by a pin-and-slot connection 335 is a link 336 slidably supported by a slot 337 on a stud 338 carried by the individual tape frame 217. A spring 339 holds the link 336 with the right end wall of the slot 337 contacting the stud 338 when the parts are in their normal positions. A retaining pawl 340, supported by the frame 217, cooperates with the ratchet 332 to prevent any retrograde movement of the ratchet.

The link 336 carries a stud 341 adapted to be engaged by a slot 342 in the forward end of a link 343, which is pivoted at 344 to an arm 345 fast on a shaft 346, and which shaft is supported by the printer frames 62. A link 347 (Fig. 2) connects the arm 345 to a bell crank 348 pivoted on the shaft 311. The bell crank 348 carries rollers 350 and 351, which cooperate with plates 352 and 353, respectively, of a double plate cam secured to the printer drive shaft 202, which, as above described, makes one complete clockwise rotation during each operation of the machine.

As above stated, the notch 342 of the link 343 is normally disconnected from the stud 341, but, by means which will be hereinafter described, when one of the individual listing tapes is selected for operation, the link 343 is permitted to rock counter-clockwise about its pivot 344, whereupon the notch 342 engages the stud 341. After such engagement and during an operation of the machine, the cams 352 and 353 rock the arms 345 when the notch 342 of the link 343 is engaging the stud 341, and, during an operation of the machine, the cams 352 and 353 rock the arm 345 first clockwise and then counter-clockwise to normal position. Such clockwise movement of the arm 345 draws the link 336 to the right (Fig. 5), which rocks the arm 333 and causes the pawl 334 to turn the ratchet 332 and the feed roll 235 to feed the listing tape 212 after the printing has taken place thereon. Such printing on the tape 212 is accomplished by means of type wheels 355, which are set and actuated through the internal gearing 144 (Fig. 2) under control of the amount keys 76, as shown and described in the above-mentioned Spurlino and Rauch patent, after which impression means, to be hereinafter described, is operated to make a legible printing impression from the type wheels 355 upon the selected tape 212.

There is only one pair of cams 352 and 353, one bell crank 348, and one link 347 for all of the individual tapes 212. However, there is an arm 345 associated with each of the listing tapes 212 in the machine.

As only one of the listing tapes 212 is selected for operation at a time, in a manner to be hereinafter described, it is necessary to select which one of the tapes will be printed upon and which one of the tape feeding mechanisms will be operated for each operation of the machine.

When the particular tape is selected, the link 343 is rocked counter-clockwise, as above mentioned, by means of an arm 356, which is selectively controlled to rock in a counter-clockwise direction. This arm 356 carries a stud 357 engaging a slot 358 in the link 343, thus rocking the link 343 counter-clockwise to engage its notch 342 with the stud 341.

The arm 356 is pivoted on a shaft 359, supported by the printer frames, and has integral therewith a hub 360 (Figs. 5 and 7), to which hub is also secured an arm 361. The arm 361 has a finger 362, normally held against a pin 363 of an arm 364 (Fig. 2) secured to the shaft 359. There is an arm 356, 361, and 364 associated with each of the individual tape units.

In the normal positions of the parts, the pin 363, by its contact with the finger 362, holds the arms 361 and 356 in the positions shown in Figs. 2 and 5, whereby the pin 357 holds the notch 342 in the link 343 disengaged from the stud 341 in the tape feeding link 336.

At the proper time during the operation of the machine, the shaft 359 and the arms 364 secured thereto are rocked first in a counter-clockwise direction and then clockwise to their normal positions. Upon counter-clockwise movement of the shaft 359 and the arms 364, the arms 356 are, by means to be hereinafter described, selectively rocked in a counter-clockwise direction by springs 365, due to the fact that the pins 363 are moved away from the fingers 362. This selecting means will be hereinafter described. The means for rocking the shaft 359 in the manner above described will now be explained.

Secured to the shaft 359 (Fig. 4) is an arm 370 connected by a link 371 to a bell crank 372, which carries rollers 373 and 374, which cooperate with plates 375 and 376 of a double plate cam secured to the printer drive shaft 202.

Clockwise movement of this shaft and the cams 375 and 376, through the mechanism just described, causes the arm 370, and consequently the shaft 359 and the arms 364, to be rocked first counter-clockwise to release the pins 363 from the fingers 362, and then clockwise to normal position to restore the parts to normal positions.

INDIVIDUAL TAPE IMPRESSION MEANS

There is associated with each of the individual listing tapes a group of type wheels 355, which have been previously described. These type wheels, as above mentioned, are set by the internal gear drive mechanism through the gears 144, exactly as illustrated and described in the previously-mentioned Kreider United States patent.

There are also associated with each of the individual listing tapes a printing hammer and mechanism for operating and controlling these hammers.

For each of the individual listing tapes there is an impression hammer 381 (Figs. 5 and 7) pivoted on a rod 382 supported by the printer frames 62. Connected to the hammer 381 by a link 383 is a lever 384 pivoted on the previously-described shaft 263. The lever 384 has a finger 385 normally held against the printer frame tie bar 66 by the weight of the hammer to hold the hammer in its normal position, and in such position the hammer 381 is below the rolls 234 of the tape frame, so as not to interfere with the removal of said frame. This lever 384 carries a stud 386 adapted to cooperate with a notch 387 in a link 388 pivoted to an arm 389 secured to the previously-described shaft 311. There are a lever 384, a link 388, and an arm 389 for each of the hammers 381.

To cause the hammers 381 to print on the individual listing tapes, the arms 389 are rocked first clockwise and then counter-clockwise by means of a bell crank 390 (Fig. 5) carrying rollers 391 and 392 cooperating with plates 393 and 394 of a double plate cam secured to the printer drive shaft 202.

The cams 393 and 394, through the bell crank 390, rock the arms 389 first clockwise and then counter-clockwise to normal position. Prior to such movement of the arms 389, a finger 397 on each of the arms 319 (Fig. 6) as they are rocked counter-clockwise, as previously described, contacts a pin 398 on their associated arms 384 and rocks said arms counter-clockwise to move the pins 386 beneath the notches 387 of the links 388, and, after said pins have been so positioned, the selected one of the links 388 is rocked counter-clockwise about its pivot connection on the arm 389, whereupon the notch 387 engages the stud 386, so that, upon clockwise movement of the arm 389 to its normal position, the lever 384 is rocked counter-clockwise, causing the link 383 to rock the hammer 381 clockwise to take an impression, from the type wheels 355, on the selected individual listing tape 212. After printing, fingers 399 on the arms 319 restore the arms 384 to normal positions, shown in Fig. 5.

Connected to each of the links 388 is a link 395, which is connected to its associated arm 361, which, according to the description previously given, is rocked in a counter-clockwise direction, by its associated spring 365, when the stud 363 is moved away from the finger 362. The rocking of this arm 361 is selectively controlled by means to be hereinafter described, so that only the link 388, which is selected to print on the individual selected listing tape 212, is lowered to engage its stud 386.

Should a tape 212 break or should the supply roll become exhausted after the machine has been released and before the impression hammer 381 is operated, a flange 395 (Fig. 9) is moved beneath a surface 396 on the arm 356 when the lever 262 is rocked, in a manner previously described, thus preventing any counter-clockwise movement of the arm 356 and its connected arm 361. Therefore, under such conditions, a hammer cannot be selected and a tape-feeding means cannot be selected.

INDIVIDUAL TAPE SELECTING MEANS

The means for selecting which of the ten individual listing tapes is to be operated is under control of the keys in row 1, row 2, row 3, and row 4, shown diagrammatically in Fig. 1. There is also a plurality of manually differentially adjustable means adapted, when adjusted to certain positions, to vary the control of the selection of the individual tapes under control of the keys of rows 1, 2, 3, and 4.

In order to select one of the individual listing tapes for operation, it is necessary to select the hammer associated with that particular strip and also the feeding mechanism for that particular strip.

Therefore, since there are ten individual listing tapes, there are ten hammers and ten feeding mechanisms for those tapes, one hammer and one feeding mechanism associated with each of the tapes.

To control such selection of the individual listing tapes, there are provided in the machine ten groups of notched selecting plates or disks, which are adapted to be differentially positioned under control of the keys of rows 1, 2, 3, and 4, and also, to vary the control from these four banks of keys, there are provided two extra plates in each of the groups. These extra plates are adapted to be differentially positioned under control of the plurality of manually differentially adjustable members mentioned above, which will be hereinafter described.

Figure 15:
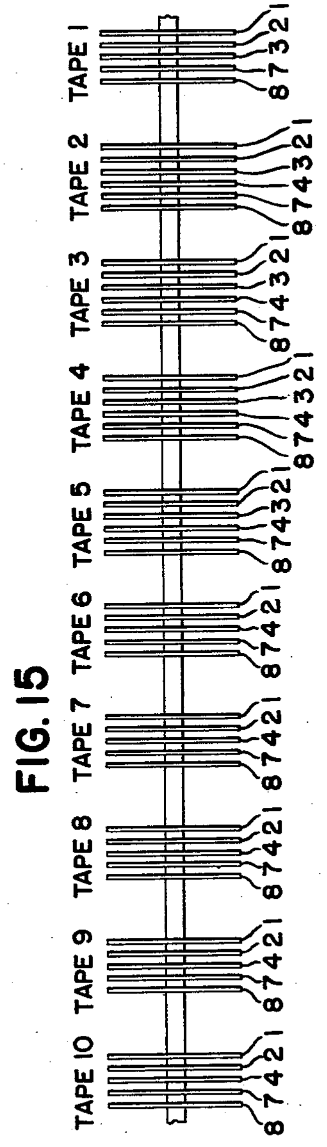
Fig. 15 is a diagrammatic view showing the several groups of control disks or plates which function in connection with the selection of the record strips or tapes for operation.

The ten groups of selecting plates for the ten individual listing tapes are shown diagrammatically in Fig. 15, and above each group of plates is indicated the listing tape number which that group controls. Some of the groups have six control plates, and others of the groups have only five control plates, as is clearly indicated in the diagrammatic figure (Fig. 15) and also in the chart (Fig. 16). These plates are all set by means of an internal-external gear drive mechanism of the type shown in the above-mentioned Kreider patent.

The drive for the internal-external gear mechanism is shown in Fig. 3, in connection with the keys 78 of row 3. Since the drive from the differential to the internal-external gear mechanism for the other rows of gears—that is, rows 1, 2, and 4—is substantially identical with that shown in Fig. 3 for row 3, a description of this one drive from the differential to the internal-external gear mechanism will suffice for all.

Since the shaft 138 and the segment 196 are differentially positioned by the differential mechanism of this figure under the control of the keys 78 of row 3, the differential movement of the segment 196, as previously described, is imparted to the link 197, the segment 200, and the shaft 143, to which is also secured a gear segment 412, which meshes with a gear 413, pivoted on a rod 414. Secured to the gear 413 is a gear 415, meshing with aninternal-external gear 416. This gear drives a pinion 417, secured to a square shaft 418. This gear drives a pinion 417, secured to a square shaft 418. Also secured to the shaft 418 is a series of pinions 417, which drive gears, not shown, but like the gear 416, associated with each of the selecting plates #2 (Fig. 15), associated with each of the ten individual listing tapes.

In this manner, when the #2 selecting plate for one tape is selected, all of the #2 plates for each of the other plates are simultaneously selected and differentially positioned according to the key 78 in row 3 which has been depressed.

In Fig. 3 there are shown shafts 420, 421, 422, 433, and 424, which are differentially positioned by means of internal-external gears 416 and pinions 417 under control of rows 1, 3, and 4, and the two manually differentially adjustable means to be later described, respectively. Thus, all of the plates shown diagrammatically in Fig. 15 are differentially positioned according to the keys in rows 1 to 4 which are depressed, and according to the manual positioning of the manually differentially adjustable means.

The selecting plates in Fig. 15 are numbered according to the plates which cooperate with the various tapes and hammers, shown on the chart in Fig. 16.

Each plate has definite positions, designated A0 to A9 inclusive and B0 to B9 inclusive, in which positions notches are adapted to be cut for the various selections. The plate #1, shown at the left and at the bottom of Fig. 16, has positions to have notches cut therein in positions B0 to B6 only, because there are only five keys and a zero position in row 1. This is the diagrammatic form of the plate shown for plate #1, which is under control of the keys in row 1.

Figure 7:
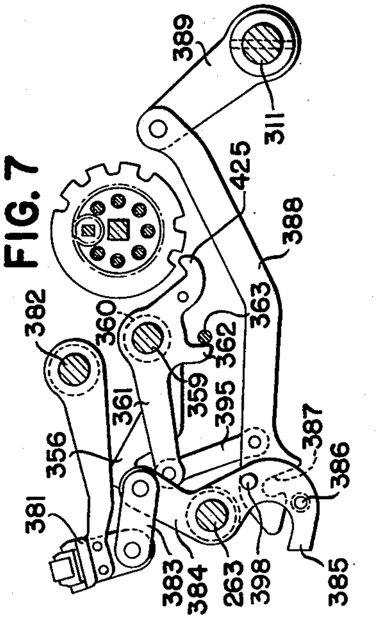
Fig. 7 is a detail view showing one of the printing hammers for one of the strips and a part of the selecting mechanism associated therewith.
Figure 6:
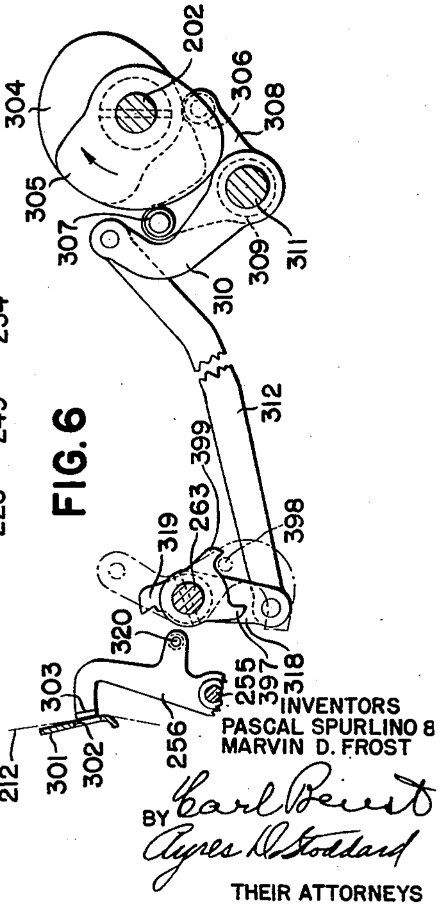
Fig. 6 is a detail view showing the release of the paper feeler mechanism during the machine operation.

The previously-described arm 361, shown in Fig. 7, has a finger 425, which is normally opposite the B0 position on plate #1. Pivoted on the previously-described arm 356, which, it will be remembered, is rigid with the arm 361, is a feeler 426 (Figs. 5 and 16) having a finger 427, which is normally opposite the B0 position in all of the plates 2, 3, 4, 7, and 8, and another finger 428, which is normally opposite the A0 position in all of the plates 2, 3, 4, 7, and 8.

After the plates 1, 2, 3, 4, 7, and 8 have been differentially set and there is a notch opposite the finger 425 of the arm 361 and also of the finger 427 of the feeler 426, then, when the shaft 359 is rocked counter-clockwise in the manner previously described, both of the arms 356 and 361 will be rocked counter-clockwise by the spring 365 to couple the link 343 with the stud 341 of the tape-feeding link 336 and also to couple the link 388 with the stud 386 on the hammer-operating lever 384. Therefore, such link 336 will feed the associated individual listing tape 212, and the associated hammer 381 will be operated to make a legible impression on such selected tape from the type wheels 355.

From the chart in Fig. 16 it will be noted that only the float and no-float keys 77 of row 2 and the zero position of row 2 control the plates #2 associated with each of the individual listing tapes 212. In connection with plate #1, which is controlled by the keys of row 1, it will be noted that there is a notch in the B0, B1, B3, B4, B5, and B6 positions of all of the plates associated with the ten strips 212. Plate 3, associated with tapes Nos. 1 to 5, has a notch cut in the A9 position for tape #1 and the A0 position for tapes 2 to 5, and on the B side a notch in the 8, 7, 6, and 5 positions, in connection with the tapes 2, 3, 4, and 5, respectively. The group of plates #4, which are controlled by row 4, are associated only with the tapes Nos. 2 to 10 inclusive. On the A side of each of the control plates, there is a notch in the 1 to 9 positions, respectively, of those nine plates, and on the B side of the same nine plates there is a notch in the 0 positions of the four plates associated with the tapes 2 to 5 inclusive, and in the 7, 8, and 9 positions of the plates associated with the tapes 8, 9, and 10, respectively.

From the above description it can be seen that, should the operator desire to select the individual tape associated with the local bank #6, which is on key #1 in the ninth position of row #3, a depression of this key will permit its associated finger 428 to engage the notch in all of the plates

#3, which, as above described, are controlled by the keys 78 of this row 3. Since no other keys are depressed and since all of the plates Nos. 1 and 2 have notches in the 0 positions on the A side thereof, the feeler 428 will be permitted to enter the notch #9 in plate #3. Therefore, the tape #1 or the tape which is selected by the key #1 in the ninth position of row 3 will be fed and will have a printed impression made thereon from the hammer 381 associated with this particular individual tape 212.

CONTROL OF INDIVIDUAL TAPE SELECTING MEANS TO VARY THE SELECTION THEREOF

Normally, the key 1 in the ninth position of row 3 and the keys 10 to 18 in the ninth to first positions of row 4 select the ten individual listing tapes; that is, these keys pick out which tape is to be selected, depending upon the key which is depressed.

It is very often desirable to change this selection so as to have other keys control the selection of the individual tapes.

In other words, there is a means, which will be described, to cause the keys 1 to 5 in row 3 and keys 10 to 14 in row 4 to select the individual listing tapes and prevent the keys 15 to 18 in row 4 from selecting the tapes. There are other conditions whereby the keys 1, 2, and 3 of row 3 and the keys 10 to 15 of row 4 may select the ten individual tapes; still other conditions whereby the keys 1 and 2 in row 3 and the keys 10 to 16 in row 4 select the individual tapes; and still another condition whereby key #1 in row 3 and all of the keys in row 4 control the selection of the individual tapes.

The means for varying the control of the individual tapes by the keys in rows 3 and 4 will now be described. This means is shown in Figs. 12 and 13 and includes the following mechanism. Mounted on a stud 441 carried by the printer frame 62 is a manually differentially adjustable knurled wheel 442 having a hub on which are engraved the characters 0 to 5. Secured to the hub 443 is a gear 444 meshing with a gear 445 mounted on a stud 446 carried by the printer frame 62. Secured to the gear 445 is a gear 447, which meshes with a rack 448 slidably mounted on rolls 449 and 450 carried by rods 451 and 452, respectively.

Spacing and guiding disks 453 (Figs. 12 and 13) are mounted on each side of the gear 447 on the rod 446, to keep the rack 448 in proper alinement with the gear 447. The rack 448 meshes with an internal-external gear 460, which drives a pinion 461 on the previously-mentioned square shaft 423, which, as previously mentioned, drives all of the selecting plates #7, there being one associated with each of the ten individual listing tapes.

Secured to the internal-external gear 460 is an aliner disk 462, with which cooperates a spring-pressed pawl 463 pivoted on a stud 464 carried by the printer frame. The notches in the disk 462 are so shaped that the pawl 463 clicks over the teeth whenever the rack 448 is adjusted either forward or backward (to the left or right as shown in Fig. 13).

From the above description it can be seen that, whenever the knurled differentially adjustable wheel 442 is adjusted from its zero position to any of its other positions 1 to 5, the rack 448 will be likewise adjusted, and, through the internal-external gear 460 and the pinion 461, the shaft 423 will be simultaneously adjusted like extents in order to position each of the selecting plates #7 (Fig. 15) associated with each of the ten individual listing tapes.

Selecting notches in the above-mentioned selecting plates #7 are cut in the positions indicated in the chart in Fig. 16, in both the A and the B selecting positions. For example, the plate #7 associated with the #1 tape has notches cut in the 0, 1, 2, 3, and 4 positions on the A side, but has no notches cut in the B positions of this plate. This cutting of the notches in the plate #7 associated with the tape #1 indicates that, when the knurled wheel 442 is set in the 0, 1, 2, 3, or 4 positions, and the notches in the other plates Nos. 2, 3, and 8, to be described, are in positions whereby the finger 428 (Fig. 16) can enter the notches in the plates 2, 3, 7, and 8, then the #1 tape will be selected for operation.

In connection with the plate #7 associated with tape #5, it will be noticed that there are notches on the A side in the 0, 1, 2, and 3 positions, and a notch on the B side in the 4 position. This means, of course, that, if the knurled wheel 442 is set in the 4 position and the other plates Nos. 1, 2, 3, 4, and 8 are set so that notches are opposite the finger 427, the #5 individual tape will be selected for operation.

Mounted adjacent the knurled wheel 442 is another manually differentially adjustable knurled wheel 465, having a hub 466, on which are engraved the characters 0 to 5, like those engraved on the hub 443 of the wheel 442. Secured to the hub 466 is a gear 467, meshing with a gear 468 having secured to the side thereof a gear 469, which meshes with a rack 470 slidably mounted on rolls, not shown but like the rolls 449 and 450 for the rack 448. Spacing disks 471 on each side of the gear 469 are used to keep the rack 470 in alinement with the gear 469. The rack 470 also meshes with a gear 472, which drives a pinion (not shown) on the previously-described square shaft 424, to which shaft are secured all of the pinions to operate the tape-selecting plates #8 in each of the groups of plates shown diagrammatically in Fig. 15. Secured to the gear 472 is a notched aliner plate 473, with which cooperates a spring-pressed pawl 474 to keep the parts in proper alinement.

There are ten of these selecting plates #8, as shown in Fig. 15, one being associated with each of the individual listing tapes. These selecting plates have notches in the positions as shown in the diagram in Fig. 16, to alter the control of the selection of the tapes 1 to 10 under control of the keys in rows 1 to 4, according to the positions in which the notches are cut in these plates #8.

It has been previously described how the keys 77, 78, and 79 and the keys in row 1 control the selection of the various individual listing tapes Nos. 1 to 10.

That selection takes place when the differential manually adjustable wheels 442 and 465 are both set in their zero positions.

When the differentially adjustable wheels 442 and 465 are set or moved into other positions from the zero positions, they alter the control of the selection of the individual listing tapes 1 to 10 according to the positions into which the respective selecting plates Nos. 7 and 8 are set under control of the mechanism shown in Figs. 12 and 13.

When both of the wheels 442 and 465 are in their zero positions, then key #1 of row 3 and keys Nos. 18 to 10 of row 4 select tapes Nos. 1 to 10, respectively. This is in accordance with the notches cut in the positions shown in the chart in Fig. 16.

As the manually differentially adjustable wheels 442 and 465 are moved into the various positions, they vary the selection of the tapes 1 to 10, or, in other words, they change the control of the selection of these tapes from the keys in row 3 and row 4, according to the notches cut in the positions of various plates Nos. 1 to 4 and 7 and 8, in each of the groups of plates shown diagrammatically in Fig. 15, there being, as above mentioned, one group of plates associated with each of the individual listing tapes.

With the wheel 465 in its zero position and the wheel 442 moved into its 1 position, then keys Nos 1 and 2 of row 3 and keys 17 to 10 select tapes 1 to 10, respectively.

With wheel 465 in its zero position and wheel 442 moved into No. 2 position, then keys 1, 2, and 3 of row 3 and keys 16 to 10 select tapes 1 to 10, respectively. With wheel 465 in zero position and wheel 442 moved into its 3 position, then keys 1, 2, 3, and 4 of row 3 and keys 15 to 10 select tapes 1 to 10, respectively.

With wheel 465 in zero position and wheel 442 moved into its 4 position, then keys 1 to 5 of row 3 and keys 14 to 10 of row 4 select tapes 1 to 10, respectively.

With the wheel 465 in zero position and wheel 442 moved into its 5 position, the notches are so cut in the plates 7 and 8 that all ten tapes are disabled; that is, none of the keys in rows 3 or 4 will select a tape when the wheels 442 and 465 are set in the last above mentioned positions; that is, the wheel 465 in zero and the wheel 442 in its 5 position.

The same selection of tapes by the keys in rows 3 and 4 (above mentioned) applies when the wheel 465 is sitting in its 0, 1, or 2 position, and the wheel 442 is moved into its 1 to 5 positions, respectively.

When wheel 465 is moved into its 3 position and wheel 442 is in its 5 position, then key No. 10 of row 4 selects No. 10 tape, and tapes 1 to 9 are disabled. In other words, the selectivity of keys 1 of row 3 and 18 to 11 of row 4 is rendered ineffective.

With the wheel 465 in the 4 position and wheel 442 in its 5 position, then keys 10 and 11 of row 4 select tapes 10 and 9, respectively, and tapes 1 to 8 are disabled; that is, they are not selected because the control of the keys 1 and 2 in row 3 and 18 to 12 in row 4 is rendered ineffective.

When the wheel 465 is in its 5 position and the wheel 442 is in its 5 position, then keys 11, 12, and 13 of row 4 select tapes 10, 9, and 8, respectively, and tapes 1 to 7 are disabled—that is, they are not selected by the other keys of rows 3 and 4—because the particular setting of the wheels 465 and 442 has rendered the selection of the tapes under the control of those other keys effective.

While the form of mechanism herein shown and described is admirably adapted to fulfill the objects primarily stated, it is to be understood that it is not intended to confine the invention to the one specific form or embodiment herein disclosed, for it is susceptible of embodiment in various other forms.

What is claimed is:

1. In a machine of the class described, the combination of machine operating means; a plurality of insertable record strip carriers; recording means relating to each carrier for making records on the strip carried thereby; actuating means operated by the machine operating means for causing the operation of the various recording means; a plurality of manipulative devices for selectively rendering said recording means for one or another of said record strips operable by said actuating means; and a plurality of manually adjustable means to render the selectivity of certain manipulative devices ineffective.

2. In a machine of the class described, the combination of machine operating means; a plurality of insertable record strip carriers; recording means relating to each carrier for making records on the strip carried thereby; actuating means operated by the machine operating means for causing the operation of the various recording means; a plurality of manipulative devices for selectively rendering said recording means for one or another of said record strips operable by said actuating means; and a plurality of manually differentially adjustable means adapted to render ineffective the selectivity of all but one of said manipulative devices when one of said adjustable means is adjusted to a certain position and another of said adjustable means is adjusted to a certain position.

3. In a machine of the class described, the combination of machine operating means; a plurality of insertable record strip carriers; recording means relating to each carrier for making records on the strip carried thereby; actuating means operated by the machine operating means for causing the operation of the various recording means; a plurality of manipulative devices for selectively rendering said recording means for one or another of said record strips operable by said actuating means; and a plurality of manually differentially adjustable means adapted to render ineffective the selectivity of all but two of said manipulative devices, when one of said adjustable means is adjusted to a certain position, and another of said adjustable means is adjusted to a certain position.

4. In a machine of the class described, the combination of machine operating means; a plurality of insertable record strip carriers; recording means relating to each carrier for making records on the record strip carried thereby; actuating means operated by the machine operating means for causing the operation of the various recording means; a plurality of manipulative devices for selectively rendering said recording means for one or another of said record strips operable by said actuating means; and a plurality of manually differentially adjustable means adapted to render ineffective the selectivity of all but three of said manipulative devices, when one of said adjustable means is adjusted to a certain position and another of said adjustable means is adjusted to a certain position.

5. In a machine of the class described, the combination of machine operating means; a plurality of insertable record strip carriers; recording means relating to each carrier for making records on the strip carried thereby; actuating means operated by the machine operating means for causing the operation of the various recording means; a plurality of manipulative devices for selectively rendering said recording means for one or another of said record strips operable by said actuating means; and a plurality of manually differentially adjustable means adapted to render ineffective all of said manipulative devices when one of said adjustable means is adjusted to a certain position and another of said adjustable means is adjusted to any one of a certain plurality of its positions.

6. In a machine of the class described, the combination of machine operating means; a plurality of insertable record strip carriers; recording means relating to each carrier for making records on the strip carried thereby; actuating means operated by the machine operating means for causing the operation of the various recording means; a plurality of manipulative devices, certain ones of which selectively render said recording means for one or another of said record strips operable by said actuating means; and a plurality of manually differentially adjustable means adapted to render ineffective certain of said certain ones of the manipulative devices, and to render effective certain ones of the remainder of said manipulative devices, according to the positions into which said adjustable means are positioned.

7. In a machine of the class described, the combination of machine operating means; a plurality of insertable record strip carriers; recording means relating to each carrier for making records on the strip carried thereby; actuating means operated by the machine operating means for causing the operation of the various recording means; selecting means for selectively rendering the recording means for one or another of said record strips operable by said actuating means; a plurality of manipulative devices, certain ones of which control said selecting means; and a plurality of manually differentially adjustable means, adapted to render ineffective certain of said ones of said manipulative devices, and adapted to render effective certain of the remainder of said manipulative devices.

8. In a machine of the class described, the combination of machine operating means; a plurality of insertable record strip carriers; recording means relating to each carrier for making records on the strip carried thereby; actuating means operated by the machine operating means for causing the operation of the various recording means; selecting means for selectively rendering the recording means for one or another of said record strips operable by said actuating means; a plurality of manipulative devices, certain ones of which control said selecting means; and a plurality of manually differentially adjustable means, adapted to render ineffective variable numbers of said certain ones of the manipulative devices, and adapted to render effective variable numbers of the remaining manipulative devices, depending upon the positions to which said adjustable means are adjusted.

9. In a machine of the class described, the combination of machine operating means; a plurality of insertable record strip carriers; recording means relating to each carrier for making records on the record strip carried thereby; actuating means operated by the machine operating means for causing the operation of the various recording means; selecting means for selectively rendering the recording means for one or another of said record strips operable by said actuating means; a plurality of manipulative devices, certain ones of which control said selecting means; differentially positionable means to control the effectivity of all of said manipulative devices; and a plurality of manually positionable members to actuate said differentially positionable means to vary the control of the positionable means.

10. In a machine of the class described, the combination of a plurality of insertable record strip carriers; recording and feeding means for each strip; a plurality of manipulative devices for selecting different recording and feeding means for operation, depending upon the manipulative devices operated; and two manually differentially adjustable members for superseding the selectivity of said devices upon adjustment of said members to certain positions.

11. In a machine of the class described, the combination of a plurality of record strip carriers; recording and feeding means for each strip; a plurality of manipulative devices for selecting different recording and feeding means for operation, depending upon the manipulative devices operated; a manually differentially adjustable member for varying the selection of the recording and feeding means; and a second differentially adjustable member for altering the varied selection of said recording and feeding means.

12. In a machine of the class described, the combination of a plurality of insertable record strip carriers; recording and feeding means for each strip; selecting means for selectively rendering the recording and feeding means operable; depressible keys controlling the selecting means; a manually adjustable member; and means intermediate the member and the selecting means and operated by the member to vary the selectivity of the selecting means.

13. In a machine of the class described, the combination of a plurality of insertable record strip carriers; recording and feeding means for each strip; selecting means for selectively rendering the recording and feeding means operable; depressible keys controlling the selecting means; a manually adjustable member; a rack and gear device operated by said member; and means actuated by the rack and gear device and cooperating with the selecting means to alter the selectivity of the latter upon adjustment of said member.

14. In a machine of the class described, the combination of a plurality of insertable record strip carriers; recording and feeding means for each strip; selecting means for selectively rendering the recording and feeding means operable; depressible keys controlling the selecting means; a plurality of manually adjustable members; and means operable by each of said members and cooperating with said selecting means to set up conditions whereby various selections of said recording and feeding means are effected by said manipulative devices according to the positions into which said members have been adjusted.

PASCAL SPURLINO.
MARVIN D. FROST.

REFERENCES CITED

The following references are of record in the file of this patent:

UNITED STATES PATENTS

| Number | Name | Date |
|---|---|---|
| 2,361,662 | Spurlino et al. | Oct. 31, 1944 |
| 2,467,704 | Spurlino et al. | Apr. 19, 1949 |